(12) United States Patent
Bobye

(10) Patent No.: US 12,455,384 B2
(45) Date of Patent: Oct. 28, 2025

(54) SYSTEMS, METHODS, AND MEDIA FOR ANALYZING MULTIPLE FILTERS IN A SOLUTION DOMAIN TO IDENTIFY FILTER INSTABILITY

(71) Applicant: NovAtel Inc., Calgary (CA)

(72) Inventor: Michael Bobye, Calgary (CA)

(73) Assignee: NovAtel Inc., Alberta (CA)

( * ) Notice: Subject to any disclaimer, the term of this patent is extended or adjusted under 35 U.S.C. 154(b) by 247 days.

(21) Appl. No.: 18/115,458

(22) Filed: Feb. 28, 2023

(65) Prior Publication Data
US 2024/0288587 A1 Aug. 29, 2024

(51) Int. Cl.
*G01S 19/23* (2010.01)
*G01S 19/49* (2010.01)

(52) U.S. Cl.
CPC .............. *G01S 19/23* (2013.01); *G01S 19/49* (2013.01)

(58) Field of Classification Search
CPC ................................ G01S 19/23; G01S 19/49
USPC ...................................... 342/357.32
See application file for complete search history.

(56) References Cited

U.S. PATENT DOCUMENTS

| | | |
|---|---|---|
| 6,408,245 B1 | 6/2002 | An et al. |
| 8,155,874 B2 | 4/2012 | Cho et al. |
| 9,285,482 B2 | 3/2016 | Vourc'h et al. |
| 10,895,646 B2 | 1/2021 | Junker et al. |
| 11,073,396 B2 | 7/2021 | Yang et al. |
| 11,280,617 B2 | 3/2022 | Lam |
| 12,259,707 B2 * | 3/2025 | Jauch ................... G05B 19/406 |
| 2016/0223683 A1 | 8/2016 | Boyarski |
| 2022/0146281 A1 | 5/2022 | Becheret |
| 2023/0314143 A1 * | 10/2023 | Käppi ..................... G01S 19/49 701/472 |

FOREIGN PATENT DOCUMENTS

| | | | |
|---|---|---|---|
| CN | 115201869 A | * | 10/2022 |
| CN | 115242297 A | * | 10/2022 |

(Continued)

OTHER PUBLICATIONS

European Search Report for corresponding EP Patent Application No. EP24157191 mailed Jul. 22, 2024, 9 pages.

(Continued)

*Primary Examiner* — Harry K Liu
(74) *Attorney, Agent, or Firm* — Cesari and McKenna, LLP

(57) ABSTRACT

Techniques are provided for analyzing multiple filters in a solution domain to identify filter instability. A processor may compute, for each filter, a residual value for each of one or more update types utilizing misclosure values that correspond to the update type and are from a rolling history. The processor may compute a ratio value from the residual values computed for the same update type and across two different filters. The ratio value may indicate which filter is experiencing a larger magnitude of difference between two solutions utilized to generate a combined solution. The processor may compare the ratio value, over a time period, with one or more threshold values to identify at least one unstable filter. In response, the processor may take one or more actions, e.g., using the solution from a stable filter instead of the unstable filter, re-initializing the unstable filter using the stable filter, etc.

20 Claims, 5 Drawing Sheets

(56) References Cited

FOREIGN PATENT DOCUMENTS

| EP | 1102397 | A2 | 5/2001 |
|---|---|---|---|
| WO | 2022037340 | A1 | 2/2022 |

OTHER PUBLICATIONS

Ger M. et al., "Multiple model concepts in navigational applications", 2016 DGON Intertial Sensors and Systems (ISS), IEEE, Sep. 20, 2016, pp. 1-20.
Pak Jung Min et al., "Self-recovering extended Kalman filtering algorithm based on model-based diagnosis and resetting using an assisting FIR filter", ARXIV, vol. 173, Jan. 15, 2016, pp. 645-658.

* cited by examiner

| History Epoch | Update Epoch | Filter 1 | | | | Filter 2 | | | | Misclosure Ratio | |
|---|---|---|---|---|---|---|---|---|---|---|---|
| | | Position Misclosure (m) | Velocity Misclosure (m/s) | Position Residual (m) | Velocity Residual (m/s) | Position Misclosure (m) | Velocity Misclosure (m/s) | Position Residual (m) | Velocity Residual (m/s) | Pos Ratio | Vel Ratio |
| 1 | 1 | 0.614 | 0.181 | 0.614 | 0.181 | 0.615 | 0.181 | 0.615 | 0.181 | 0.998 | 1.000 |
| 2 | 2 | 0.336 | 0.079 | 0.495 | 0.140 | 0.338 | 0.079 | 0.496 | 0.140 | 0.997 | 1.000 |
| 3 | 3 | 0.336 | 0.079 | 0.448 | 0.123 | 0.338 | 0.079 | 0.450 | 0.123 | 0.997 | 1.000 |
| 4 | 4 | 0.696 | 0.079 | 0.521 | 0.114 | 0.695 | 0.079 | 0.522 | 0.114 | 0.999 | 1.000 |
| 5 | 5 | 0.915 | 0.079 | 0.621 | 0.108 | 0.913 | 0.079 | 0.620 | 0.108 | 1.001 | 1.001 |
| 6 | 1' | 1.958 | 0.079 | 1.038 | 0.079 | 1.707 | 0.079 | 0.944 | 0.079 | 1.099 | 1.001 |
| 7 | 2' | 1.958 | 0.079 | 1.349 | 0.079 | 1.707 | 0.079 | 1.205 | 0.079 | 1.120 | 1.001 |
| 8 | 3' | 1.958 | 0.079 | 1.601 | 0.079 | 1.707 | 0.079 | 1.418 | 0.079 | 1.129 | 1.001 |
| 9 | 4' | 4.849 | 0.079 | 2.678 | 0.079 | 1.783 | 0.079 | 1.597 | 0.079 | 1.677 | 1.001 |
| 10 | 5' | 6.593 | 0.079 | 3.962 | 0.079 | 2.963 | 0.079 | 2.034 | 0.079 | 1.948 | 1.001 |
| 11 | 1'' | 8.891 | 0.079 | 5.544 | 0.079 | 3.893 | 0.079 | 2.567 | 0.079 | 2.160 | 1.001 |
| 12 | 2'' | 10.665 | 0.079 | 7.261 | 0.079 | 0.455 | 0.079 | 2.459 | 0.079 | 2.953 | 1.001 |
| 13 | 3'' | 13.038 | 0.079 | 9.271 | 0.079 | 0.823 | 0.079 | 2.366 | 0.079 | 3.918 | 1.001 |
| 14 | 4'' | 15.564 | 0.079 | 11.389 | 0.079 | 1.391 | 0.079 | 2.313 | 0.079 | 4.924 | 1.001 |
| 15 | 5'' | 17.971 | 0.079 | 13.624 | 0.079 | 1.785 | 0.079 | 2.057 | 0.079 | 6.622 | 1.001 |
| 16 | 1''' | 20.572 | 0.079 | 15.951 | 0.079 | 2.214 | 0.079 | 1.477 | 0.079 | 10.800 | 1.001 |
| | 2''' | 24.969 | 0.079 | 18.878 | 0.079 | 0.933 | 0.079 | 1.521 | 0.079 | 12.411 | 1.001 |
| | 3''' | 28.093 | 0.079 | 21.914 | 0.079 | 1.076 | 0.079 | 1.552 | 0.079 | 14.116 | 1.001 |
| | 4''' | 31.566 | 0.079 | 25.121 | 0.079 | 1.279 | 0.079 | 1.533 | 0.079 | 16.387 | 1.001 |
| | 5''' | 35.167 | 0.079 | 28.527 | 0.079 | 1.341 | 0.079 | 1.440 | 0.079 | 19.816 | 1.001 |

FIG. 3

SYSTEMS, METHODS, AND MEDIA FOR ANALYZING MULTIPLE FILTERS IN A SOLUTION DOMAIN TO IDENTIFY FILTER INSTABILITY

BACKGROUND

Technical Field

The invention relates generally to filter analysis, and in particular, to systems, methods, and media for analyzing multiple filters in a solution domain to identify filter instability.

Background Information

Inertial navigation systems (INS) typically combine inertial measurement units (IMU) data with additional complementary data from external aiding sensors such as, but not limited to, global navigation satellite systems (GNSS). For example, an INS filter may combine the IMU data with GNSS data (e.g., GNSS raw measurements) that is used as complementary data, i.e., updates. The external sensors are used to provide observability to a set of IMU error states that are modelled and used to correct errors in the accumulated IMU data.

A GNSS/INS solution combines the measurements from an IMU with satellite positioning information for a combined solution (e.g., GNSS/INS solution). The combined solution benefits from the strengths of each approach to the position problem for navigation systems. The inherent error in IMU measurements, if not correctly dealt with or estimated as part of an integrated GNSS/INS, can cause significant problems in the GNSS/INS solution, e.g., inaccurate GNSS/INS solution. For example, a bias error, if not removed from the IMU measurement, is integrated twice as part of the mechanization process. In this case, a constant bias (error) in acceleration becomes a linear error in velocity and a quadratic error in position. A constant bias in attitude rate (gyro) becomes a quadratic error in velocity and a cubic error in position.

With conventional approaches, errors in IMU measurements are typically detected in the observation domain, and the INS filter can estimate and remove (i.e., correct) errors from the IMU measurements. If, for example, an error is undetected, the INS solution computed by the INS filter based on the IMU measurements may be inaccurate. However, the INS filter may believe that the INS solution is in fact accurate, which may cause the INS filter to reject the GNSS data. An INS filter's confidence in an INS solution that is inaccurate may be referred to as INS filter instability. As a result of the INS filter instability, the GNSS/INS solution output from the INS filter will likely be inaccurate.

SUMMARY

Techniques are provided for analyzing multiple filters in a solution domain to identify filter instability. Specifically, and as will be described in further detail below, at least two filters, e.g., INS filters, are configured differently and compute misclosure values. The misclosure values can be used to compute residual values that may be analyzed in a solution domain to determine, i.e., identify, if one or more of the at least two filters are unstable.

Specifically, the at least two filters may be configured differently to generate one or more misclosure values for a current epoch, e.g., current update epoch. Each of the one or more misclosure values may correspond to a different update type of one or more update types, e.g., position, velocity, attitude, etc. Because the at least two filters are configured differently, the at least two filters operate differently to compute the misclosure values and/or output solutions (e.g., GNSS/INS solution). In an embodiment, a misclosure value may represent a difference between two solutions that are utilized to determine a combined solution. For example, a misclosure value may represent a difference between a GNSS solution and an INS solution computed at a filter for a current update epoch, wherein the GNSS solution and INS solution can be combined to generate a GNSS/INS solution.

A processor, e.g., a solution domain module executed by the processor, may generate one or more rolling histories. In an embodiment, a rolling history includes (1) misclosure values that are computed for the current update epoch for each of the at least two filters and (2) misclosure values that are computed for one or more previous update epochs for each of the at least two filters.

The processor may compute, for each filter, a residual value for each update type. The processor may compute a residual value for an update type utilizing the misclosure values that correspond to the update type and are from the rolling history. In an embodiment, a residual value may be computed for an update type utilizing a root mean square (RMS) algorithm with the misclosure values that correspond to the update type and are from the rolling history. In an embodiment, a residual value may represent a magnitude of the difference between two solutions that are utilized to determine a combined solution at a filter for an update type over a rolling history. For example, a residual value may represent a magnitude of the difference between the GNSS solution and the INS solution at a filter for an update type over the rolling history.

The processor may compute a ratio value from the residual values computed for the same update type and across at least two different filters. The ratio value may provide an indication regarding which filter is experiencing a larger magnitude of difference between two solutions utilized to generate a combined solution over the rolling history, e.g., magnitude of difference between the GNSS solution and INS solution over the rolling history. If a filter is experiencing a larger magnitude of difference than the other filter over the rolling history, the processor may determine that the other filter is more reliable, e.g., more stable, than the filter over the rolling history for a solution (e.g., GNSS/INS solution). As such, the processor may determine that the filter is less reliable, e.g., more unstable, than the other filter over the rolling history for the solution.

In an embodiment, the processor may compare the ratio value, over a time period (e.g., 20 update epochs), with one or more threshold values. Based on the comparison, the processor may determine/identify at least one filter as being unstable. In response to determining that a filter is unstable, the processor may take one or more actions. For example, such actions may include, but are not limited to, using the solution (e.g., GNSS/INS solution) from a stable filter instead of the unstable filter, re-initializing the unstable filter using a stable filter, etc.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIG. 3 is an illustration of an example data structure including a plurality of update epochs with corresponding misclosure values, residual values, and ratio values that may be utilized to identify filter instability according to the one or more embodiments as described herein.

DESCRIPTION

Figure 1A:
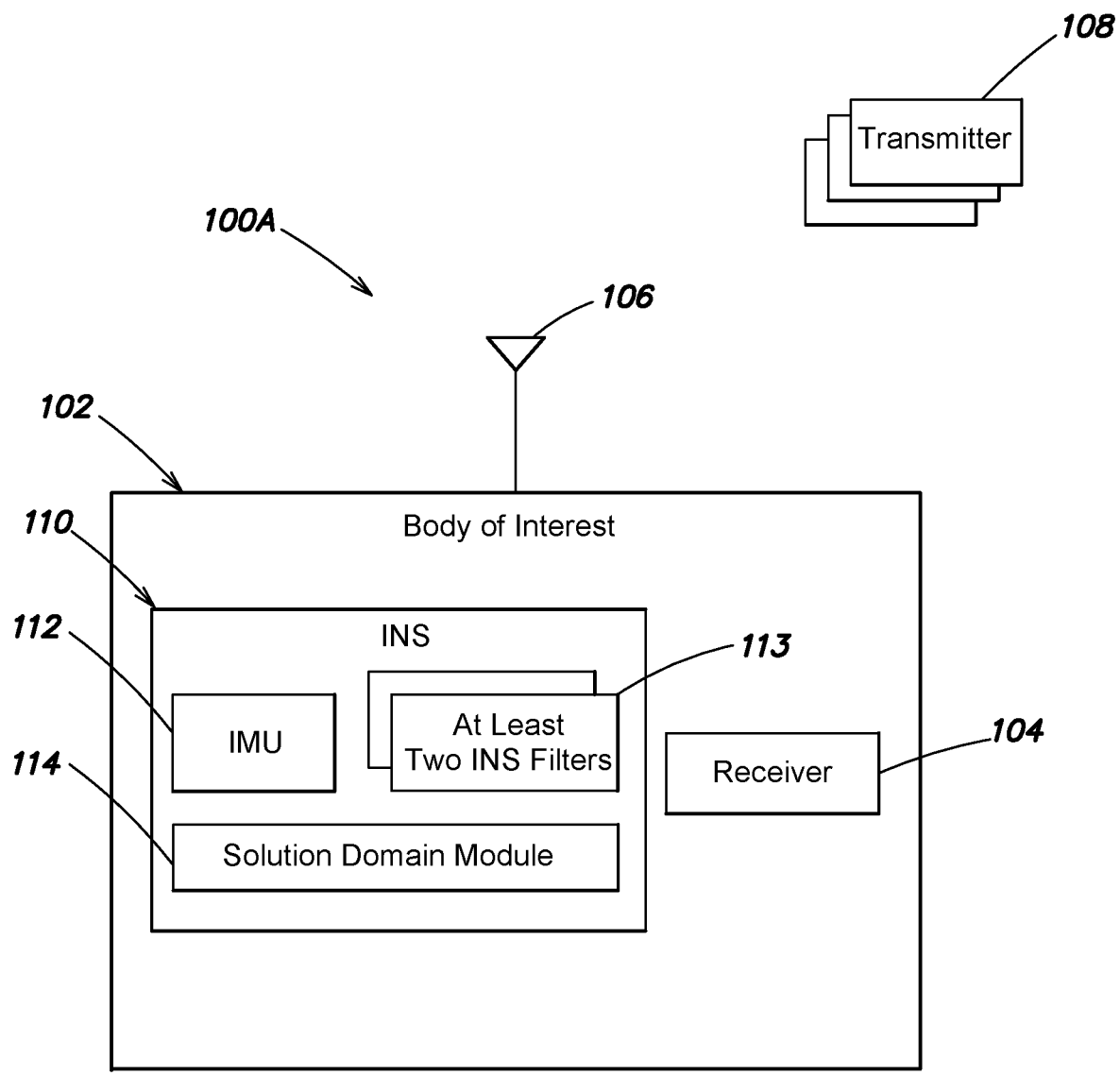
FIG. 1A is an illustration of an example system environment for analyzing multiple filters in a solution domain to identify filter instability according to the one or more embodiments as described herein.

FIG. 1A is an illustration of an example system environment 100A for analyzing multiple filters in a solution domain to identify filter instability according to the one or more embodiments described herein. System environment 100A includes a body of interest 102, e.g., a moving vehicle, a stationary object, etc. Coupled to the body of interest 102 may be a receiver 104, an inertial navigation system (INS) 110, and an antenna 106. The antenna 106, coupled to the body of interest 102 and in communication with receiver 104, may receive one or more signals from one or more transmitters 108.

In an embodiment, the one or more transmitters 108 may be one or more Global Navigation Satellite System (GNSS) satellites that transmit one or more navigation signals, e.g., GNSS satellite signals (not shown). Although reference may be made to transmitters 108 being GNSS satellites transmitting GNSS satellite signals, it is expressly contemplated that the one or more embodiments as described herein may be utilized with any of a variety of different types of transmitters 108. For example, transmitters 108 may be terrestrial transmitters that transmit any of a variety of different navigation signals. As such, the description of transmitters 108 being GNSS satellites that transmit GNSS signals should be taken for illustrative purposes only.

Receiver 104 may, based on the reception of signals at the antenna 106, produce raw measurements (e.g., GNSS raw measurements), such as pseudoranges, carrier phases, and Doppler velocities; position (e.g., GNSS position), velocity (e.g., GNSS velocity) and time (e.g., GNSS time), position covariance, and velocity covariance; and, as appropriate, GNSS observables. The GNSS raw measurements, GNSS position, velocity and time, the position covariance and the velocity covariance and the GNSS observables may be hereinafter referred to collectively as "GNSS data." Additionally, the GNSS position, velocity, and time may be referred to as a GNSS solution.

The INS 110 includes an inertial measurement unit (IMU) 112 that reads data from sensors (e.g., one or more accelerometers and/or gyroscopes) that produce IMU measurements. In an embodiment, the sensors may be orthogonally positioned. Each of the INS filters 113 processes the IMU measurements to compute INS based position, velocity, and/or attitude. The computed INS based position, velocity, and/or attitude may be referred to as an INS solution. Additionally, the INS filter may process, in a known manner, the GNSS data, when available, and the IMU measurements to produce GNSS/INS based position, velocity and/or attitude. The computed GNSS/INS based position, velocity and/or attitude may be referred to as a GNSS/INS solution. The receiver 104, INS 110, and IMU 112 may include processors, memory, storage, other hardware, software, and/or firmware (not shown).

In an embodiment, the INS 110 and/or receiver 104 operate in a solution domain during or after the INS 110 and/or receiver 104 compute a navigation solution and/or update a navigation solution. For example, the INS 104 computes the GNSS/INS solution in the solution domain. In an embodiment, the INS 110 and/or receiver 104 operate in an observation domain prior to the INS 110 and/or receiver 104 computing a navigation solution and/or updating a navigation solution. For example, the IMU measurements, the GNSS raw measurements, and the GNSS observables may be obtained in the observation domain.

The INS 110 may also include a solution domain module 114 that implements the one or more embodiments as described herein. In an embodiment, the solution domain module 114 may be hardware, software, or a combination of hardware and software. In an embodiment, the solution domain module 114 is executed by a processor (not shown).

Figure 1B:
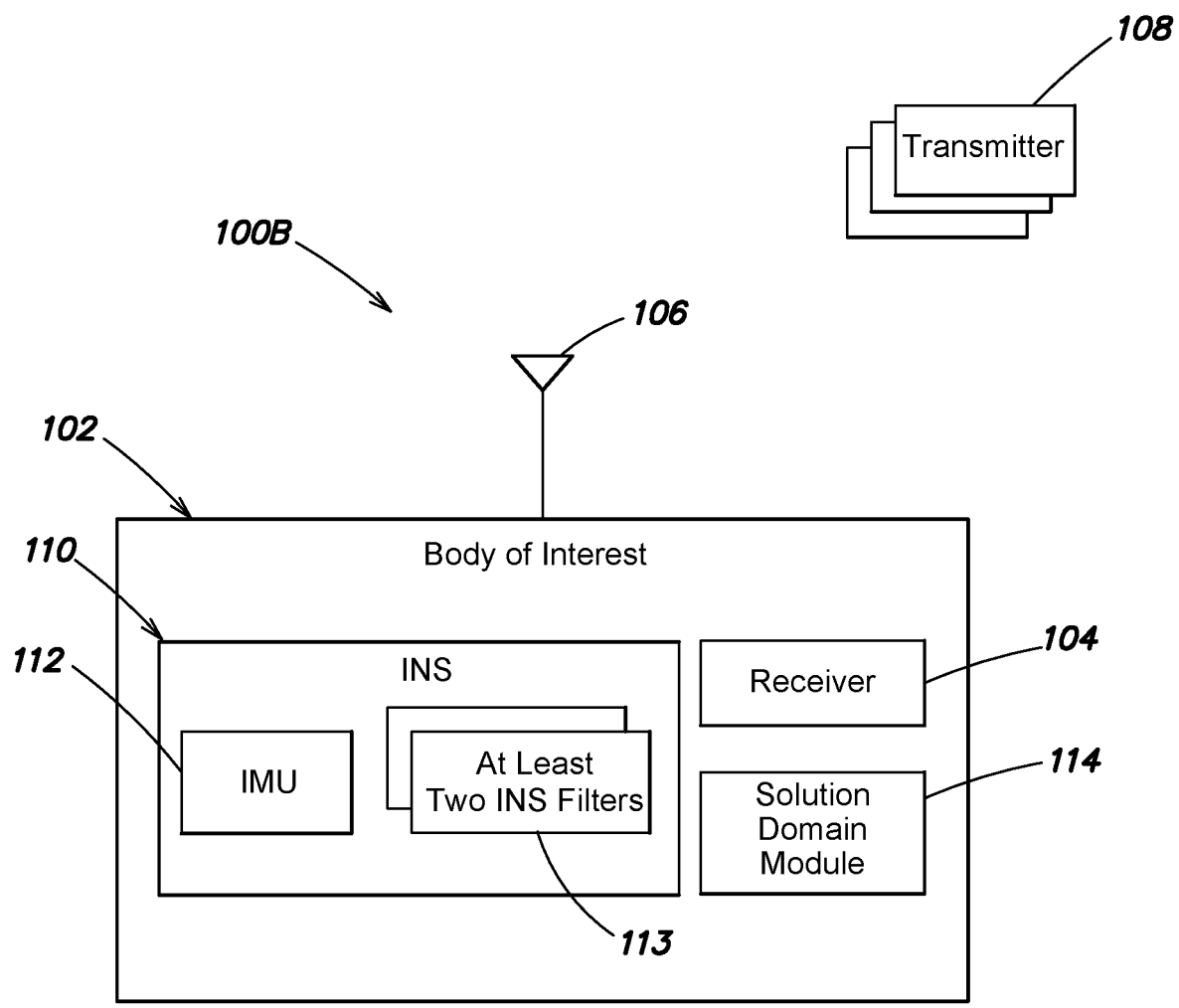
FIG. 1B is an illustration of a different example system environment for analyzing multiple filters in a solution domain to identify filter instability according to the one or more embodiments as described herein.
Figure 1C:
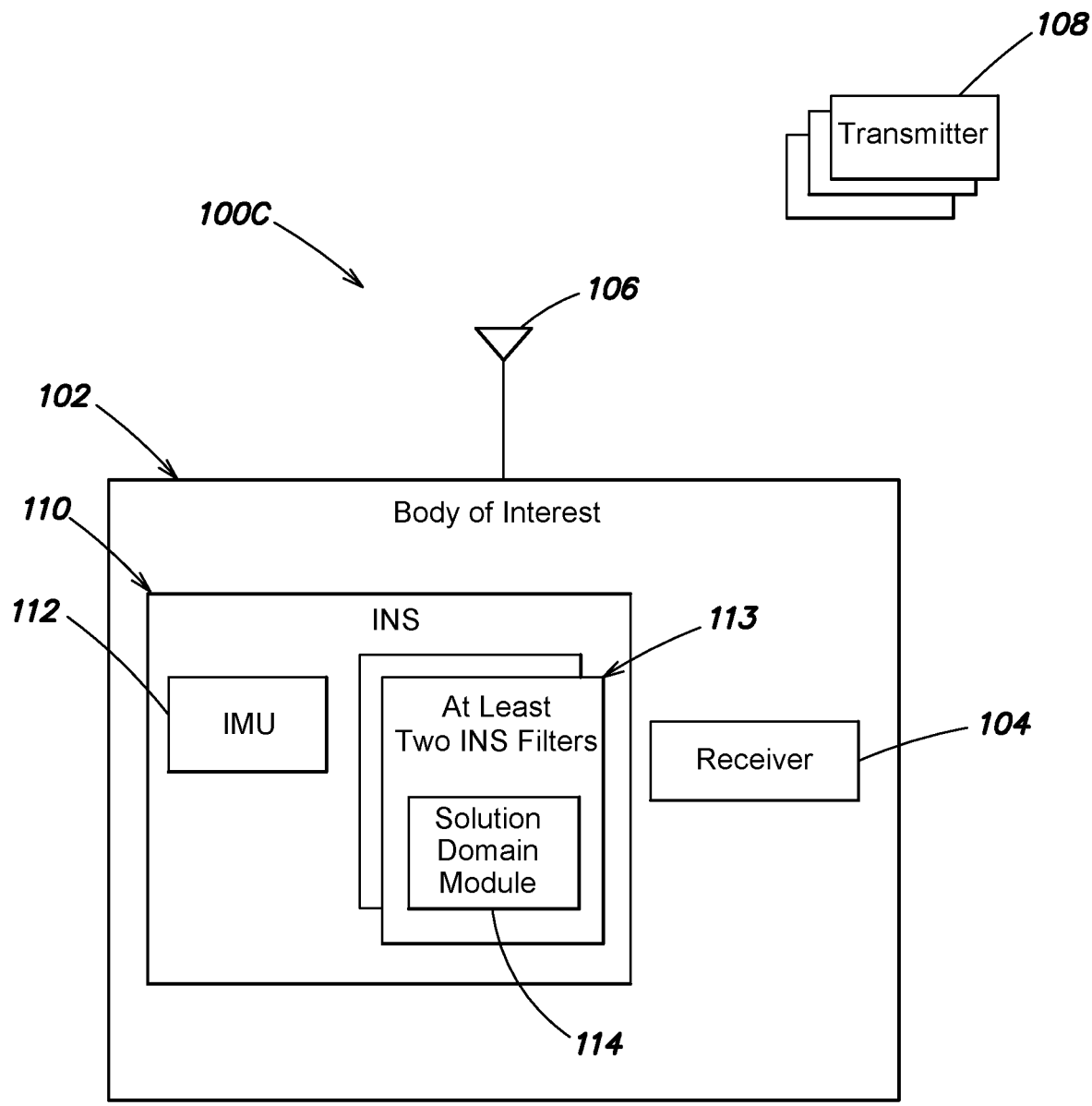
FIG. 1C is an illustration of an additional different example system environment for analyzing multiple filters in a solution domain to identify filter instability according to the one or more embodiments as described herein.

FIGS. 1B and 1C depict different example system environments 100B and 100C, respectively, for analyzing multiple filters in a solution domain to identify filter instability according to the one or more embodiments as described herein. FIG. 1B is similar to FIG. 1A, however the solution domain module 114 of FIG. 1B is external to the INS 110 and coupled to the body of interest 102. FIG. 1C is also similar to FIG. 1A, however the solution domain module 114 of FIG. 1C is internal to at least one INS of the filters 113.

Figure 2:
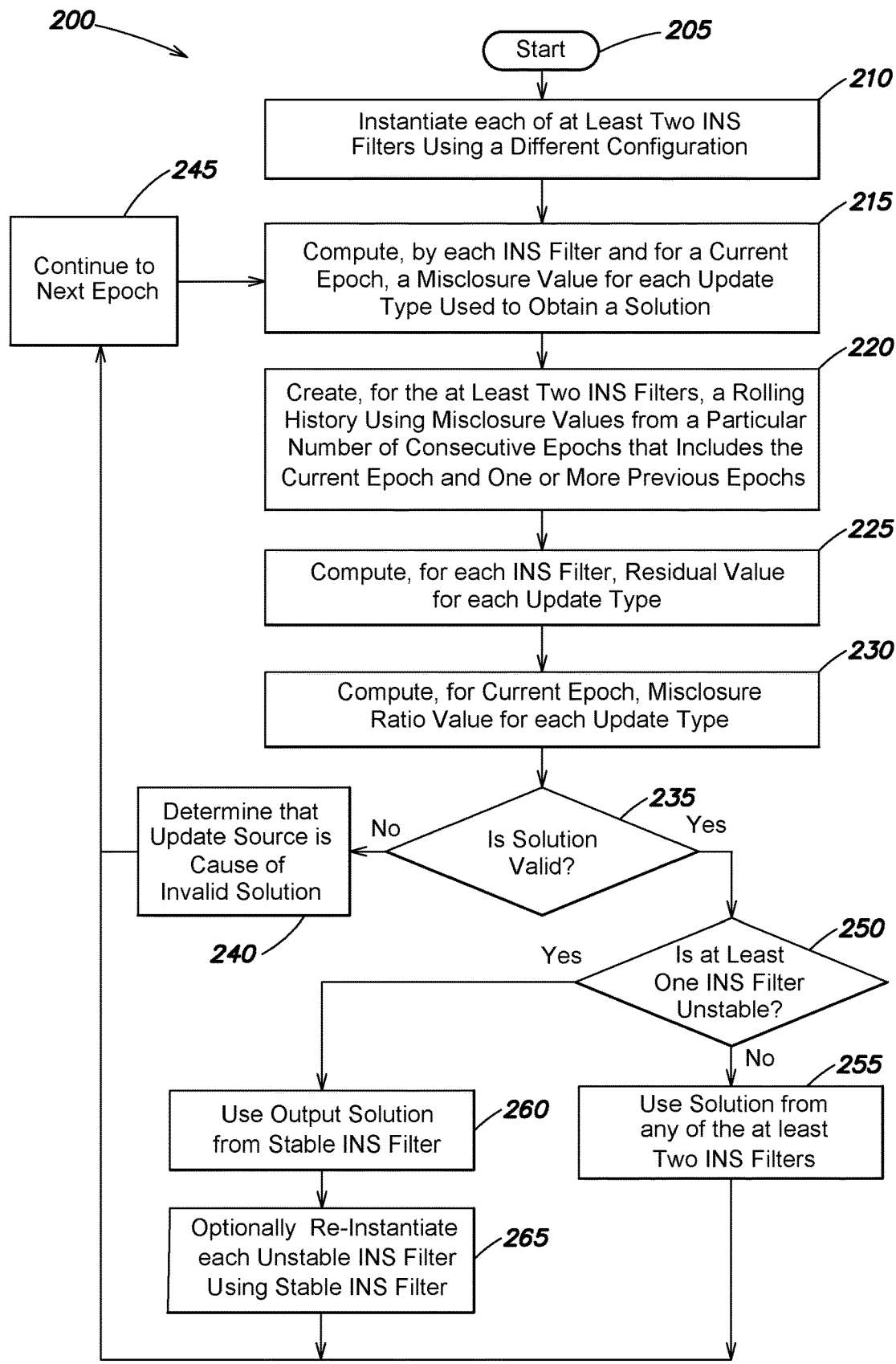
FIG. 2 is a flow diagram of a sequence of steps for analyzing multiple filters in a solution domain to identify filter instability according to the one or more embodiments as described herein.

FIG. 2 is a flow diagram of a sequence of steps for analyzing multiple filters in a solution domain to identify filter instability according to the one or more embodiments as described herein. Further, although the examples as described in relation to FIG. 2 use two different filters (e.g., INS filters), it is expressly contemplated that any number of a plurality of filters (e.g., 2, 3, 4, 5, 6, etc.) may be used according to the one or more embodiments as described herein. As such, the discussion of two different filters in relation to FIG. 2 is for illustrative purposes only. Moreover, although FIG. 2 may refer to INS filters, it is expressly contemplated that the one or more embodiments as described herein are applicable to any of a variety of different systems that may compute and/or update a navigation solution, e.g., a system including any of a variety of different types of filters that may use at least two different solutions to determine a combined navigation solution. As such, the reference to INS filters in relation to FIG. 2 is for illustrative purposes only. In an embodiment, steps 215 through 265 of FIG. 2 may be performed in the solution domain.

The procedure 200 starts at step 205 and continues to step 210 where the processor instantiates each of at least two INS filters using a different configuration. As an illustrative example, let it be assumed that the at least two INS filters include a first INS filter, e.g., filter 1, and a second INS filter, e.g., filter 2. Filter 1 and filter 2 may compute, in parallel, their respective GNSS/INS solutions.

In this example, let it be assumed that filter 1 is the primary INS filter and filter 2 is the secondary/backup filter. As such, the GNSS/INS solution computed by filter 1 may be used as the output solution until filter 1 is determined to be unstable according to the one or more embodiments as described herein and as described in further detail below. When filter 1 is determined to be unstable, the GNSS/INS solution computed by filter 2 may be used as the output solution according to the one or more embodiments as described herein and as described in further detail below.

According to the one or more embodiments as described herein, filter 1 and filter 2 are configured differently. Because filters 1 and 2 are configured differently, filters 1 and 2 operate differently to compute misclosure values and/or output solutions (e.g., GNSS/INS solution) using the same data (e.g., IMU data), as will be described in further detail below in relation to step 215 of FIG. 2. Therefore, and as will be described in further detail below, values computed from the misclosure values of filters 1 and 2 can be analyzed in the solution domain to determine if a filter is unstable such that, for example, one or more actions (e.g., switchover from an unstable filter to a stable filter, re-initialize the unstable filter using the stable filter) can be taken.

In an embodiment, a configuration of a filter may affect one or more operations of the filter. Such operations may include, but are not limited to, which updates are used by the filter to compute an output solution (e.g., GNSS/INS solution), how selected updates are applied by the filter to compute the output solution, how process noise is initialized by the filter to compute the output solution, etc.

For example, filters 1 and 2 may be configured differently to use the same update, but each of filters 1 and 2 may utilize a different algorithm (e.g., requirements) to assess the validity of the update (e.g., GNSS update). Based on the assessments, each of filters 1 and 2 may utilize a different subset of the same update. As an illustrative example, let it be assumed that filters 1 and 2 implement a linear quadratic estimation (LQE) algorithm, i.e., filters 1 and 2 operate as Kalman filters. During an update step of the LQE algorithm, filters 1 and 2 may utilize different tolerances with the same position update received from receiver 104.

For example, filter 1 may utilize a stricter tolerance such that the position update is de-weighted/skipped, while filter 2 may utilize a looser tolerance such that the full weight of the position update is used. Therefore, and based on the stricter tolerance, filter 1 can select and apply a subset of the position update to the IMU data obtained from IMU 112 to compute a GNSS/INS solution. Further, and based on the looser tolerance, filter 2 can apply the full weight of the position update to the same IMU data obtained from the IMU 112 to compute a GNSS/INS solution. Therefore, and in this example, filter 1 and filter 2 are configured differently to select different portions, of the position update, that are applied to the same IMU data to compute respective GNSS/INS solutions.

As another example, filters 1 and 2 may be configured differently to use different updates that rely on the same source observations. For example, filter 1 may be configured to obtain a velocity update based on accumulated doppler range (ADR) measurements, e.g., carrier phase measurements, from the receiver 104. In an embodiment, a subset of the ADR measurements may be used. Filter 2 may be configured to obtain a velocity update using a least squares filter. In both cases, the source observations are the same but the intermediate processing steps are different such that filters 1 and 2 use velocity updates in a different form. Therefore, and in this example, filter 1 and filter 2 are configured differently to apply different velocity updates, from the same source, to the same IMU data to compute respective GNSS/INS solutions.

Further, it is expressly contemplated that filters 1 and 2 can be configured differently utilizing a combination of the two different configurations as described above or any of a variety of different techniques that affect which updates (e.g., GNSS updates) and how the updates are applied to data (e.g., IMU data) to compute a solution (e.g., GNSS/INS solution).

In an embodiment, filters 1 and 2 may have different filter properties such that they are configured differently. For example, filters 1 and 2 may implement the LQE algorithm, i.e., filters 1 and 2 operate as Kalman filters. During a prediction step of the LQE algorithm, filters 1 and 2 may initialize process noise differently such that filters 1 and 2 are configured differently to compute an output solution.

Although particular examples are provided for the manner in which filters 1 and 2 are configured differently, it is expressly contemplated that filters 1 and 2 can be configured differently in any of a variety of ways such that filters 1 and 2 compute misclosure values and/or output solutions differently using the same IMU data.

The procedure 200 continues to step 215 and each of the at least two filters, for a current epoch, computes a misclosure value for each update type that is used to obtain a solution (e.g., GNSS/INS solution). For this example, let it be assumed that there are two update types and, specifically, a position update and a velocity update. Based on the different configurations, filters 1 and 2 can each use a received position update and a received velocity update to compute a position misclosure value and a velocity misclosure value. Accordingly, and for this example, each of filters 1 and 2 computes a position misclosure value and a velocity disclosure value.

In an embodiment, a misclosure value may represent or indicate a difference (i.e., divergence) between two solutions that are utilized to determine a combined solution at a filter for an update type. For example, a misclosure value may represent or indicate a difference between a GNSS solution and an INS solution for an update type at filter 1. An increasing misclosure value may be indicative of the INS solution and GNSS solution becoming more different. Conversely, a decreasing misclosure value or a misclosure value nearing zero may be indicative of the INS solution and the GNSS solution becoming more equal/consistent. As an example, let it be assumed that the current update epoch is update epoch 5 and that filter 1 and filter 2 compute the following misclosure values for position and velocity:

| | INS Filter 1 | | INS Filter 2 | |
| --- | --- | --- | --- | --- |
| Update Epoch | Position Misclosure (m) | Velocity Misclosure (m/s) | Position Misclosure (m) | Velocity Misclosure (m/s) |
| 5 | 0.915 | 0.079 | 0.913 | 0.079 |

In the table above, m may be a unit and represent meters and m/s may be a unit and represent meters per second. As depicted in the table, misclosure values between filter 1 and filter 2 are of similar magnitude, thus indicating that filter 1 and filter 2 are fairly consistent/equal.

Procedure 200 continues to step 220 and the solution domain module 114 creates, for the at least two filters, a rolling history using misclosure values from a number of consecutive epochs (e.g., update epochs) that includes the current epoch and one or more previous epochs. In an embodiment, the number, e.g., window size, of consecutive update epochs is 5 and the solution domain module 114 creates a rolling history using the misclosure values from the 5 consecutive update epochs.

A window size of 5 is for illustrative purposes only, and it is expressly contemplated that the window size may be any value. In an embodiment, the window size may be any value that is equal to or greater than 2. For this example, let it be assumed that the window size is 5. As such, the solution domain module 114 may create a rolling history (History Epoch 1) that includes 4 previous update epochs, e.g., update epochs 1 through 4, and the current update epoch, e.g., update epoch 5. Therefore, History Epoch 1 includes the misclosure values from update epochs 1 through 5. For example, the solution domain module 114 may create History Epoch 1 as follows:

| | History Epoch 1 | | | |
|---|---|---|---|---|
| | Filter 1 | | Filter 2 | |
| Update Epoch | Position Misclosure (m) | Velocity Misclosure (m/s) | Position Misclosure (m) | Velocity Misclosure (m/s) |
| 1 | 0.614 | 0.181 | 0.615 | 0.181 |
| 2 | 0.336 | 0.079 | 0.338 | 0.079 |
| 3 | 0.336 | 0.079 | 0.338 | 0.079 |
| 4 | 0.696 | 0.079 | 0.695 | 0.079 |
| 5 | 0.915 | 0.079 | 0.913 | 0.079 |

After the completion of procedure 200 where the current update epoch is update epoch 5, the next update epoch will be the current update epoch. For this example, let it be assumed that the next update epoch is update epoch 1'. When update epoch 1' is the current update epoch, the procedure 200 repeats for a next iteration, as will be described in further detail below, and the solution domain module 114 may create a next rolling history (History Epoch 2) at step 220 for the next iteration. History Epoch 2 may be created by removing the oldest update epoch (e.g., update epoch 1) from History Epoch 1 and adding the misclosure values for update epoch 1' to History Epoch 1. For this example, let it be assumed that the misclosure values for update epoch 1' are 1.958, 0.079, 1.707, and 0.079. As such, the solution domain module 114 may create History Epoch 2 as follows:

| | History Epoch 2 | | | |
|---|---|---|---|---|
| | Filter 1 | | Filter 2 | |
| Update Epoch | Position Misclosure (m) | Velocity Misclosure (m/s) | Position Misclosure (m) | Velocity Misclosure (m/s) |
| 2 | 0.336 | 0.079 | 0.338 | 0.079 |
| 3 | 0.336 | 0.079 | 0.338 | 0.079 |
| 4 | 0.696 | 0.079 | 0.695 | 0.079 |
| 5 | 0.915 | 0.079 | 0.913 | 0.079 |
| 1' | 1.958 | 0.079 | 1.707 | 0.079 |

After the completion of procedure 200 where the current update epoch is update epoch 1', the next update epoch will be the current update epoch. For this example, let it be assumed that the next update epoch is update epoch 2'. When update epoch 2' is the current update epoch, the procedure 200 repeats for a next iteration, as will be described in further detail below, and the solution domain module 114 may create a next rolling history (History Epoch 3) at step 220 for the next iteration. History Epoch 3 may be created by removing the oldest update epoch (e.g., update epoch 2) from History Epoch 2 and adding the misclosure values for update epoch 2' to History Epoch 2. For this example, let it be assumed that the misclosure values for update epoch 2' are 1.958, 0.079, 1.707, and 0.079. As such, the solution domain module 114 may create History Epoch 3 as follows:

| | History Epoch 3 | | | |
|---|---|---|---|---|
| | Filter 1 | | Filter 2 | |
| Update Epoch | Position Misclosure (m) | Velocity Misclosure (m/s) | Position Misclosure (m) | Velocity Misclosure (m/s) |
| 3 | 0.336 | 0.079 | 0.338 | 0.079 |
| 4 | 0.696 | 0.079 | 0.695 | 0.079 |
| 5 | 0.915 | 0.079 | 0.913 | 0.079 |
| 1' | 1.958 | 0.079 | 1.707 | 0.079 |
| 2' | 1.958 | 0.079 | 1.707 | 0.079 |

Therefore, and on each iteration of procedure 200, the solution domain module 114 may create a next rolling history at step 220 for the current update epoch and one or more previous update epochs.

The procedure continues to step 225 and the solution domain module 114 computes, for each INS filter, a residual value for each update type. In an embodiment, the solution domain module 114 computes a residual value for an update type utilizing the misclosure values from the rolling history that correspond to the update type.

In this example, the current update epoch is update epoch 5. As such, the solution domain module 114 may compute the position residual value for filter 1 using the position misclosure values (e.g., 0.614, 0.336, 0.336, 0.696, and 0.915) computed by filter 1 at update epochs 1 through 5. The solution domain module 114 may compute the velocity residual value for filter 1 using the velocity misclosure values (e.g., 0.181, 0.079, 0.079, 0.079, 0.079) computed by filter 1 at update epochs 1 through 5. In an embodiment, the solution domain module 114 may use a root mean square (RMS) to compute the position and velocity residual values as follows:

$$RMS = \sqrt{\frac{1}{n}\sum_i x_i^2}$$

where n is the number of measurements, e.g., 5, and $x_i$ is each value, e.g., each misclosure value in the set. As such, the solution domain module 114 uses the RMS to compute the position residual value for filter 1 as 0.621 and the velocity residual value for filter 1 as 0.108. The position residual value for filter 2 is 0.620 and the velocity residual value for filter 2 is 0.108.

An RMS value is a measure of the magnitude of a set of numbers. Since a misclosure value represents the difference between the GNSS solution and the INS solution, an increasing RMS value indicates an increasing magnitude of difference between the GNSS solution and the INS solution over the rolling history. As such, a residual value may represent a magnitude of the difference between the GNSS solution and the INS solution at a filter for an update type over the rolling history.

Procedure 200 continues to step 230 and the solution domain module 114 computes, for the current epoch, a misclosure ratio value for each update type. In an embodiment, the solution domain module 114 computes a misclosure ratio value for an update type using residual values, for at least two different filters, corresponding to the update type and the current update epoch. For example, the position residual values for filters 1 and 2 that correspond to update epoch 5 are 0.621 and 0.698, respectively. The velocity residual values for filters 1 and 2 that correspond to update epoch 5 are 0.108 and 0.108. As such, the solution domain module 114 may compute the position misclosure ratio (PMR) value and velocity misclosure ratio value (VMR) at update epoch 5 as follows:

$$PMR = \frac{0.621}{0.620} = 1.001$$

$$VMR = \frac{0.108}{0.108} = 1.000$$

In the example above, the solution domain module 114 utilizes the position and velocity misclosure values for filter 1 as the numerator and the position and velocity misclosure values for filter 2 as the denominator. However, it is expressly contemplated that the solution domain module may utilize the misclosure values for filter 2 as the numerator and the misclosure values for filter 1 as the denominator.

In this example, filter 1 corresponds to the numerator and filter 2 corresponds to the denominator. According to the one or more embodiments as described herein, a ratio value increasing from 1 may indicate that the difference between the GNSS solution and INS solution at filter 1 is becoming larger than the difference between the GNSS solution and INS solution at filter 2. A ratio value decreasing from 1 may indicate that the difference between the GNSS solution and the INS solution at filter 2 is becoming larger than the difference between the GNSS solution and the INS solution at filter 1.

Further, a ratio value may provide an indication regarding how consistent or inconsistent the GNSS and INS solutions are at the two filters. Specifically, a ratio value indicates that the GNSS and INS solutions at filters 1 and 2 are becoming more consistent, i.e., equal, as the ratio value approaches a value of 1. However, the ratio value indicates that the GNSS and INS solutions at filters 1 and 2 are becoming more inconsistent, i.e., unequal, as the ratio value deviates from a value of 1, e.g., as the ratio value increases or decreases from 1. As such, the position and velocity ratio values may provide a measure as to the relative consistency (i.e., agreement) or inconsistency (i.e., disagreement) between the GNSS solution and INS solution at the at least two filters.

The one or more embodiments may store the update epochs and their corresponding computed values in a data structure that may be maintained. For example, the data structure may be maintained in memory, storage, etc. FIG. 3 is an illustration of an example data structure 300 including a plurality of update epochs with corresponding misclosure values, residual values, and ratio values that may be utilized to identify filter instability according to the one or more embodiments as described herein. The data structure 300 may be generated by solution domain module 114 and may be updated by solution domain module 114 with the computed values for a current update epoch. For example, the solution domain module 114 may generate a new row of data structure 300 that corresponds to the current update epoch and store the computed values corresponding to the current update epoch in the newly generated row. In the example of FIG. 3, data structure 300 includes 20 update epochs. However, it is expressly contemplated that data structure 300 may include any number of update epochs.

The data structure 300 includes column 301 that is titled "update epoch" and includes an identifier that identifies each row of data structure 300 that corresponds to a different update epoch. In this example, the first row of data structure 300 corresponds to update epoch 1, the second row of data structure 300 corresponds to update epoch 2, the third row of data structure 300 corresponds to update epoch 3, the fourth row of data structure 300 corresponds to update epoch 4, the fifth row of data structure 300 corresponds to update epoch 5, the sixth row of data structure 300 corresponds to update epoch 1', and so forth.

The solution domain module 114 may add a value for a current update epoch after the value is generated based on the procedure 200. For example, and when update epoch 5 is the current update epoch, the solution domain module 114 may generate the fifth row of data structure 300 and add the misclosure values to the fifth row after the misclosure values are computed for update epoch 5 at step 215. The solution domain module 114 may also add the residual values and the ratio values to the fifth row of data structure 300 after the residual values and ratio values are computed for update epoch 5 at steps 225 and 230, respectively.

The data structure 300 further includes column 313 that is titled "History Epoch" and includes a value identifying each of a plurality of history epochs that include consecutive update epochs. In the example of FIG. 3, History Epoch 1 includes update epochs 1 through 5, History Epoch 2 includes update epochs 2 through 1', History Epoch 3 includes update epochs 3 through 2', History Epoch 4 includes update epochs 4 through 3', History Epoch 5 includes update epochs 5 through 4', History Epoch 6 includes update epochs 1' through 5', History Epoch 7 includes update epochs 2' through 1", History Epoch 8 includes update epochs 3' and through 2", and so forth.

Data structure 300 includes column 302 that is titled "Filter 1" and column 303 that is titled "Filter 2". Columns 302 and 303 includes sub-columns that store values that are computed for filter 1 and filter 2, respectively.

Sub-columns 304 and 305 are titled "position misclosure" and store the position misclosure values that are computed by filters 1 and 2, respectively. Sub-columns 306 and 307 are titled "velocity misclosure" and store the velocity misclosure values that are computed by filters 1 and 2, respectively.

Sub-columns 308 and 309 are titled "position residual" and store position residual values computed for filters 1 and 2, respectively. Sub-columns 310 and 311 are titled "velocity residual" and store velocity residual values computed for filters 1 and 2, respectively.

Data structure 300 also includes column 312 that is titled "misclosure ratio". Column 312 includes sub-columns that store ratio values that are computed using the residual values corresponding to filters 1 and 2. Specifically, sub-column 313 of column 312 that is titled "pos ratio" stores position ratio values that are computed for each update epoch using corresponding residual values at the current update epoch for filters 1 and 2. Sub-column 314 of column 312 that is titled "vel ratio" stores velocity ratio values that are computed for each update epoch using corresponding residual values at the current update epoch for filters 1 and 2. The magnitude of change, e.g., rate of change, of a ratio value over multiple update epochs may indicate a degree at which the solutions at two filters is becoming more inconsistent. For example, the position ratio value increasing from 4.924 at update epoch 4' to 19.816 at update epoch 5'" may indicate that the position solution at filter 1 and filter 2 is most inconsistent over History Epoch 16.

As will be described in further detail below, the data structure 300 may be utilized to determine if a solution is valid and also identify filter instability.

Referring back to FIG. 2, and after the misclosure ratio values are computed at step 230, the procedure continues to step 235. At step 235, the solution domain module 114 determines if a solution is valid. The solution domain module 114 may determine if a solution (e.g., GNSS/INS solution) is valid using the computed residual values with expected tolerances.

As explained above, the two filters are configured differently to use GNSS data with the same IMU data to compute the GNSS/INS solution. In this example, the source providing the GNSS data (e.g., GNSS satellite, terrestrial transmitter, etc.) is the update source since the GNSS data is being used to update the IMU data. Since the same update source is providing GNSS data to both filters, it is expected that both filters would experience similar difference between the GNSS and INS solutions over the expected tolerance(s) if the cause of an invalid solution is the source. If only one filter experiences a difference between the GNSS and INS solutions over the expected tolerance(s), then it can be determined that the update source is not the cause of the difference and instead the INS filter, i.e., INS filter instability, is the cause of the difference.

The solution domain module 114 may determine that a solution is valid if each residual value, for at least one filter over a time period, is determined to be less than or equal to its corresponding expected tolerance. Otherwise, the solution domain module 114 may determine that a solution is invalid. The threshold values and/or time period may be any values that are user defined or preconfigured. For example, the time period may be 5 update epochs, 20 update epochs, or a different number of update epochs.

As an illustrative example, let it be assumed that the expected tolerance for position is 1.5 m, the expected tolerance for velocity is 0.19 m/s, and the time period is 5 update epochs. For this example, let it further be assumed that the current update epoch is 5. Therefore, the solution domain module 114 compares the position residual values over update epochs 1 through 5 with 1.5 m that is the position expected tolerance. Additionally, the solution domain module 114 compares the velocity residual values over update epochs 1 through 5 with 0.19 m/s that is the velocity expected tolerance.

As depicted in data structure 300 of FIG. 3, each of the position residual values for filters 1 and 2 over update epochs 1 through 5 is less than the expected tolerance of 1.5 m. Additionally, each of the velocity residual values for filters 1 and 2 over update epochs 1 through 5 is less than the expected tolerance of 0.19 m/s. As such, the solution domain module 114 determines that the solution is valid over update epochs 1 through 5. As a different example, let it be assumed that the expected tolerance for position is 3 m, the expected tolerance for velocity is 0.19 m/s, and time period is 20 update epochs.

As depicted in data structure 300 of FIG. 3, the position residual values for filter 1 over update epochs 5' through 5" are greater than the expected tolerance of 3 m, while the position residual values for filter 1 over update epochs 1 through 4' are less than the expected tolerance of 3 m. Additionally, each velocity residual value for filter 1 over update epochs 1 through 5" (20 update epochs) is less than the expected tolerance of 0.19 m/s. Further, each position residual value for filter 2 over update epochs 1 through 5" (20 update epochs) is less than the expected tolerance of 3 m. Moreover, each velocity residual value for filter 2 over update epochs 1 through 5" (20 update epochs) is less than the expected tolerance 0.19 m/s.

Even though particular position residual values for filter 1 exceed the expected tolerance for position over the time period of 20 update epochs, the solution domain module 114 still determines that the solution is valid because the position residual values and the velocity residual values for filter 2 are less than their respective thresholds over the time period of 20 update epochs.

If, for example, at least one position residual value and/or a velocity residual value for filter 2 was greater than its respective threshold, then the solution domain module 114 would determine that the solution is invalid.

If it is determined that the solution is invalid at step 235, the procedure continues to step 240. At step 240, the solution domain module 114 determines that the update source is the cause of the invalid solution. The procedure continues to step 245 and the solution domain module 114 continues to a next epoch. In this example, the next update epoch is update epoch 1'. As such, the procedure continues to step 215 for a next iteration of procedure 200 where update epoch 1' is the current update epoch. Thus, the procedure 200 is performed again and iteratively for a current update epoch, e.g., update epoch 1'. For example, the misclosure values are computed for update epoch 1', a rolling history (e.g., History epoch 2) is created, values (e.g., residual and ratio values) are computed to determine if the solution is valid at step 235.

Referring back to the example where the current update epoch is update epoch 5, the solution domain module 114 determines that the solution is valid at step 235. As such, the procedure 200 continues from step 235 to step 250. At step 250, the solution domain module 114 determines if at least one filter is unstable. In an embodiment, the solution domain module 114 determines, in the solution domain, if the at least one filter is unstable. The solution domain module 114 may determine if a filter is unstable based on a comparison of the misclosure ratio values with one or more threshold values.

In an embodiment, the solution domain module 114 determines that a filter is unstable if (1) at least one misclosure ratio value over a time period and for the filter is equal to or greater than an upper threshold value or (2) at least one misclosure ratio value over the time period and for the filter is equal to or less than a lower threshold value. When a misclosure ratio value is equal to or greater than the upper threshold value, the solution domain module 114 determines that the filter corresponding to the numerator of the ratio value (e.g., filter 1) is unstable. When a misclosure ratio value is less than or equal to the lower threshold value, the solution domain module 114 determines that the filter corresponding to the denominator of the ratio value (e.g., filter 2) is unstable.

Therefore, filter instability can be identified in the solution domain according to the one or more embodiments as described herein. By identifying filter instability, the one or more embodiments as described herein provide an improvement over conventional techniques that do not identify an unstable filter in the solution domain and instead may utilize an inaccurate output solution from the unstable filter. Because an unstable filter can be identified, utilizing an inaccurate output solution can be avoided according to the one or more embodiments as described herein. As such, the one or more embodiments as described herein provide an improvement in the existing technological field of filter analysis for navigation systems, e.g., systems that determine position, velocity, and/or time for navigation.

The threshold values and/or time period may be any values that are user defined or preconfigured. For this example, let it be assumed that the upper threshold value is 5, the lower threshold value is 0.1, and the time period is 20 epochs, e.g., 20 update epochs. Further, consider the misclosure ratio values for the 20 update epochs are from the data structure 300 as depicted in FIG. 3. For this example, the position ratio values are greater than the upper threshold value of 5 for update epochs 5 (row 15) through 5' (row 20). Further, all ratio values are greater than the lower threshold value 0.1. Because at least one position ratio value is greater than the upper threshold value over the time period, e.g., 20 update epochs, the solution domain module 114 determines that filter 1 is unstable over the time period of 20 update epochs. Since no ratio values are less than the lower threshold value over the time period of 20 update epochs, the solution domain module 114 determines that filter 2 is stable over the time period of 20 update epochs. If, however, the position ratio values for filter 1 were not greater than the upper threshold value over the time period, the solution domain module 114 would determine that neither of filters 1 and 2 are unstable. As such, the procedure would continue from step 250 to 255. At step 255, the solution (e.g., GNSS/INS solution) from any of the at least two filters can be utilized. For this example, filter 1 is the primary filter. As such, and when neither of the filters 1 and 2 are determined to be unstable, the solution from filter 1 will continue to be used since filter 1 is stable for this example.

Referring back to the example for the 20 update epochs from the data structure 300 of FIG. 3, the solution domain module 114 determines that filter 1 is unstable over the time period of the 20 update epochs. As such, the procedure continues from step 250 to 260. At step 260, the solution from a stable filter is utilized as an output solution. In this example, filter 1 is determined to be unstable while filter 2 is determined to be stable. Therefore, a switchover process may be implemented by the solution domain module 114, on the fly, such that the output solution from filter 2 is utilized instead of the output solution from filter 1 that is unstable.

By performing the switchover process after identifying an unstable filter, a confirmed valid GNSS/INS solution can be continuously used without interruption according to the one or more embodiments as described herein. With conventional techniques, an invalid GNSS/INS solution from an unstable filter may be used, which may result in errors or inaccuracies. Because the one or more embodiments as described herein avoid such errors and inaccuracies by identifying an unstable filter and performing the switchover, the one or more embodiments as described herein provide an improvement in the existing technological field of filter analysis for navigation systems, e.g., systems that determine position, velocity, and/or time for navigation.

The procedure may continue, optionally, from step 260 to 265. At step 265, the solution domain module 114 may re-initialize the unstable filter. In an embodiment, the solution domain module 114 may re-initialize the unstable filter when at least one ratio value, from a time period, is equal to or greater than a re-initializing threshold value. For this example, let it be assumed that the re-initializing threshold value is 10 and the time period is 20 update epochs. Continuing with the example of the 20 update epochs of FIG. 3, the position ratio values for update epochs 1' (row 16) through 5' (row 20) are equal to or greater than 10. As such, the solution domain module 114 may re-initializes filter 1 when update epoch 5' (row 20) is, for example, the current update epoch.

In an embodiment, the solution domain module 114 re-initializes filter 1 using a filter information of filter 2 that is stable. The filter information may include, but is not limited to, a copy of the full filter state vector, e.g., full INS filter state vector, and covariance from filter 2 that is stable. Using the full filter state vector and covariance from filter 2, that is stable, allows for instantaneous re-initialization of filter 1 without needing coarse alignment and convergence periods. Because coarse alignment and convergence periods are not needed, the one or more embodiments as described herein provide an improvement to the computer, e.g., navigation system, itself and provide an improvement in the existing technological field of navigation systems.

The procedure continues from step 260 or step 265, when step 265 is optionally performed, to step 245. At step 245, the solution domain module 114 continues to a next update epoch. As such, the procedure continues to step 215 for a next iteration of procedure 200 for a new current update epoch. Thus, the procedure 200 is iteratively performed for a current update epoch.

It should be understood that a wide variety of adaptations and modifications may be made to the techniques. For examples, the steps of the flow diagrams as described herein may be performed sequentially, in parallel, or in one or more varied orders. Further, although the examples as described herein may refer to INS filters, it is expressly contemplated that the one or more embodiments as described herein are applicable to any of a variety of different types of filters. For example, the one or more embodiments as described herein may be applicable to GNSS Kalman filters, such as, but not limited to GNSS Kalman filters used in Precise Point Positioning (PPP), Real-Time Kinematic Positioning (RTK), delta-phase positioning components, etc. Further, although the examples as described herein are rounded to a particular number of decimal digits, it is expressly contemplated that the one or more embodiments as described herein may be implemented using values that are rounded to any number of decimal digits in order to, for example, obtain different precision. As such, it should be understood that the examples are utilized herein are for illustrative purposes only.

In general, functionality may be implemented in software, hardware, or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A system, comprising:
a first filter having a first configuration, the first filter configured to generate a first misclosure value for an update type and for a current epoch;
a second filter having a second configuration, the second filter configured to generate a second misclosure value for the update type and for the current epoch,
wherein the first configuration and the second configuration are different;

a processor coupled to a memory;
a module executed by the processor, the module, when executed by the processor, is configured to:
  create a rolling history for the first filter and the second filter, wherein
    the rolling history includes, for the first filter, the first misclosure value and one or more first previous misclosure values for the update type over one or more previous epochs, and
    the rolling history includes, for the second filter, the second misclosure value and one or more second previous misclosure values for the update type over the one or more previous epochs;
  compute, for the first filter, a first residual value for the update type using the first misclosure value and the one or more first previous misclosure values;
  compute, for the second filter, a second residual value for the update type using the second misclosure value and the one or more second previous misclosure values; and
  compare the first residual value and the second residual value to (1) identify an unstable filter from the first filter and the second filter or (2) determine that the first filter and the second filter are stable.

2. The system of claim 1, wherein the first residual value and the second residual value are computed and compared in a solution domain.

3. The system of claim 1, wherein the first residual value indicates a magnitude of a difference between a first type of solution and a second type of solution, wherein the second type of solution updates the first type of solution to generate a combined solution.

4. The system of claim 1, wherein the first residual value is computed utilizing a root mean square (RMS) algorithm with the first misclosure value and the one or more first previous misclosure values.

5. The system of claim 1, wherein the module, when executed by the processor, is further configured to:
  compute a ratio value by dividing the first residual value by the second residual value;
  determine that a first output solution of the first filter is more reliable than a second output solution of the second filter when the ratio value is less than 1; and
  determine that the second output solution of the second filter is more reliable than the first output solution of the first filter when the ratio value is greater than 1.

6. The system of claim 1, wherein the first filter is a primary filter and the second filter is a backup filter, wherein the module, when executed by the processor, is further configured to:
  compute a ratio value by dividing the first residual value by the second residual value;
  re-initialize the first filter when the ratio value is equal to or greater than a re-initializing threshold value or when the one or more previous ratio values for the first filter and for a second time period are equal to or greater than the re-initializing threshold value, wherein the first filter is re-initialized using filter information from the second filter that is determined to be stable.

7. The system of claim 6, wherein the module, when executed by the processor, is further configured to:
  re-initialize the first filter when the ratio value is equal to or greater than a re-initializing threshold value or when the one or more previous ratio values for the first filter and for a second time period are equal to or greater than the re-initializing threshold value, wherein the first filter is re-initialized using filter information from the second filter that is determined to be stable.

8. A method for identifying filter instability, the method comprising:
  generating, by a first filter having a first configuration, a first misclosure value for an update type and for a current epoch;
  generating, by a second filter having a second configuration, a second misclosure value for the update type and for the current epoch,
    wherein the first configuration and the second configuration are different;
  creating a rolling history for the first filter and the second filter, wherein
    the rolling history includes, for the first filter, the first misclosure value and one or more first previous misclosure values for the update type over one or more previous epochs, and
    the rolling history includes, for the second filter, the second misclosure value and one or more second previous misclosure values for the update type over the one or more previous epochs;
  computing, for the first filter and by a processor, a first residual value for the update type using the first misclosure value and the one or more first previous misclosure values;
  computing, for the second filter and by the processor, a second residual value for the update type using the second misclosure value and the one or more second previous misclosure values; and
  comparing the first residual value and the second residual value to (1) identify an unstable filter from the first filter and the second filter or (2) determine that the first filter and the second filter are stable.

9. The method of claim 8, wherein the first residual value and the second residual value are computed and compared in a solution domain.

10. The method of claim 8, wherein the first residual value indicates a magnitude of a difference between a first type of solution and a second type of solution, wherein the second type of solution updates the first type of solution to generate a combined solution.

11. The method of claim 8, wherein the first residual value is computed utilizing a root mean square (RMS) algorithm with the first misclosure value and the one or more first previous misclosure values.

12. The method of claim 8, further comprising:
  computing a ratio value by dividing the first residual value by the second residual value;
  determining that a first output solution of the first filter is more reliable than a second output solution of the second filter when the ratio value is less than 1; and
  determining that the second output solution of the second filter is more reliable than the first output solution of the first filter when the ratio value is greater than 1.

13. The method of claim 8, wherein the first filter is a primary filter and the second filter is a backup filter, the method further comprising:
  computing a ratio value by dividing the first residual value by the second residual value;
  determining that the first filter is unstable when the ratio value is equal to or greater than an upper threshold value or when one or more previous ratio values for the first filter and for a first time period are equal to or greater than the upper threshold value; and
  utilizing an output solution of the second filter when the first filter is determined to be unstable.

14. The method of claim 8, further comprising:

re-initializing the first filter when the ratio value is equal to or greater than a re-initializing threshold value or when the one or more previous ratio values for the first filter and for a second time period are equal to or greater than the re-initializing threshold value, wherein the first filter is re-initialized using filter information from the second filter that is determined to be stable.

15. A non-transitory computer readable medium having software encoded thereon, the software when executed by one or more computing devices operable to:

create a rolling history for a first filter and a second filter, wherein
- the first filter has a first configuration and generates a first misclosure value for an update type for a current epoch,
- the second filter has a second configuration and generates a second misclosure value for the update type for the current epoch,
- the rolling history includes, for the first filter, the first misclosure value and one or more first previous misclosure values for the update type over one or more previous epochs, and
- the rolling history includes, for the second filter, the second misclosure value and one or more second previous misclosure values for the update type over the one or more previous epochs;

compute, for the first filter, a first residual value for the update type using the first misclosure value and the one or more first previous misclosure values;

compute, for the second filter, a second residual value for the update type using the second misclosure value and the one or more second previous misclosure values; and compare the first residual value and the second residual value to (1) identify an unstable filter from the first filter and the second filter or (2) determine that the first filter and the second filter are stable.

16. The non-transitory computer readable medium of claim 15, wherein the first residual value and the second residual value are computed and compared in a solution domain.

17. The non-transitory computer readable medium of claim 15, wherein the first residual value indicates a magnitude of a difference between a first type of solution and a second type of solution, wherein the second type of solution updates the first type of solution to generate a combined solution.

18. The non-transitory computer readable medium of claim 15, wherein the software when executed by the one or more computing devices is operable to:

compute a ratio value by dividing the first residual value by the second residual value;

determine that a first output solution of the first filter is more reliable than a second output solution of the second filter when the ratio value is less than 1; and determine that the second output solution of the second filter is more reliable than the first output solution of the first filter when the ratio value is greater than 1.

19. The non-transitory computer readable medium of claim 15, wherein the software, when executed by the one or more computing devices is operable to:

compute a ratio value by dividing the first residual value by the second residual value;

determine that the first filter is unstable when the ratio value is equal to or greater than an upper threshold value or when one or more previous ratio values for the first filter and for a first time period are equal to or greater than the upper threshold value; and utilize an output solution of the second filter when the first filter is determined to be unstable.

20. The non-transitory computer readable medium of claim 19, wherein the software when executed by the one or more computing devices is operable to: re-initialize the first filter when the ratio value is equal to or greater than a re-initializing threshold value or when the one or more previous ratio values for the first filter and for a second time period are equal to or greater than the re-initializing threshold value, wherein the first filter is re-initialized using filter information from the second filter that is determined to be stable.

* * * * *